Feb. 23, 1971 J. D. HOLM ET AL 3,566,356

MAGNETIC RECORDING DOCUMENT AND METHOD

Filed Feb. 29, 1968

INVENTORS
JOHN D. HOLM
PETER J. VOGELGESANG
BY Kinney, Alexander, Sell, Steldt & DeLaHunt
ATTORNEYS 3,566,356
MAGNETIC RECORDING DOCUMENT AND METHOD John D. Holm and Peter J. Vogelgesang, St. Paul, Minn., assignors to Minnesota Mining and Manufacturing Company, St. Paul, Minn., a corporation of Delaware Filed Feb. 29, 1968, Ser. No. 709,296
Int. Cl. G11b 5/62
U.S. Cl. 340—149 16 Claims

ABSTRACT OF THE DISCLOSURE

A document such as a credit card or transportation ticket has a subsurface magnetic recording medium for electronic processing of information associated with use of the document. The recording medium either by itself or in a composite with other magnetizable material in the document has an A.C. demagnetization curve of gradual slope which lends itself to a unique and economical test for validity as a safeguard against counterfeiting. The gradual demagnetization curve is conveniently achieved through the use of magnetizable particles of two distinctly different coercivities.

FIELD OF THE INVENTION

This invention concerns magnetic recording and especially the adaptation of magnetic recording for validating documents and for processing or transactions in which the documents are used.

BACKGROUND OF THE INVENTION

The expansion of credit cards and other substitutes for currency has created major problems in handling the mass of information involved in their use. The problem of processing the information is being solved by electronic computers, but not the problems of keeping errors within reasonable limits or safeguarding against abuses, both casual and criminal. Organized crime has been aggressively counterfeiting and stealing credit cards and other documents which in effect substitute for currency such as transportation tickets.

A great need exists for credit cards and related documents which are difficult to misuse or counterfeit and which can bep rocessed electronically so as to speed discovery of counterfeiting, theft or other misuse and also to minimize the errors and delays inevitably associated with manual handling.

SUMMARY OF THE INVENTION

The present invention provides what is believed to be the first document which incorporates adequate safeguards against liability arising out of loss, theft or counterfeiting and also is adapted to automated handling of information associated with its use at widely scattered and remote stations. The novel document has a pair of durable nonmagnetic surface layers such as paper or plastic which may be imprinted or embossed with visible indicia characteristic to its nature such as identification of the document and ts holder and any instructions as to its use. Embedded within the document is a layer or layers of magnetizable material serving as a conventional magnetic recording medium for recording and reproducing of data associated with use of the document. That interior recording medium by itself may be a composite of magnetizable material whose A.C. demagnetization curve has a gradual slope at an intermediate point, that is, a slope as defined below of less than 0.2 at a point between 10% and 90% of saturated output (saturated output being defined as 100% on the demagnetization curve). Alternatively, the document may include additional magnetizable material which together with an interior magnetizable layer provides a composite of magnetizable material whose A.C. demagnetization curve has a gradual slope at an intermediate point, permitting reliable comparison of the output at that point to the output at some other point on the A.C. demagnetization curve at which the slope is also gradual, e.g., to the output at substantial saturation of the composite magnetizable material. This relative value may be matched against a predetermined range of values as a test for validity of the document.

In a specific embodiment, the document may have a single interior layer of magnetizable material which is a homogeneous mixture in a nonmagnetizable binder of a first portion of particles of magnetizable material of low coercivity and a second portion of particles of magnetizable material of a relatively high coercivity. In this construction, the corecivity of the second portion should exceed that of the first portion by at least 200 oersteds in order to provide an A.C. demagnetization curve of desirably gradual slope. Greater differences in coercivity provide more gradual slope, permitting greater economy and reliability in validating tests. Preferably the coercivity of the second portion is at least 700 oersteds and that of the first portion is at least 150 oersteds, but not more than ⅓ that of the second portion. The minimum of 150 oersteds is desirable to guard against accidental erasure of recorded information, particularly as to credit cards which might come into contact with magnets such as are sometimes used with key chains. As for the second portion, a coercivity of at least 700 oersteds would virtually insure against accidental erasure of any information recorded on that portion of the magnetizable medium.

The gradual slope of the A.C. demagnetization curve, such as is provided through the use of magnetizable materials of different coercivities, may be used to protect the card from forgery by equiping each station at which the document is to be processed with a rather simple device. In essence, this is accomplished by the following sequential steps:

(1) incorporating into the document a composite of magnetizable material whose A.C. demagnetization curve has a slope as herein defined of less than 0.2 at a given point between 10% and 90% of saturated output,
(2) magnetizing said magnetizable material,
(3) sensing the output from said magnetizable material at said given point and the output at least at one other point on said demagnetization curve at which the slope is also less than 0.2, and
(4) matching the outputs of step (3) against predetermined values as a test for validity of the document.

Normally the output at said given point is compared to the saturated output, and the relative value of these two outputs is matched against a predetermined range of relative values, which range is just great enough to encompass possible errors such as deviations in the magnetizable material and inaccuracies in the measuring device. Alternatively or for additional protection against counterfeiting, the output at said given point may be compared to the output at a nearby intermediate point on the demagnetization curve, and the relative value thus obtained is matched against a predetermined range of values.

Conveniently such testing for validity may be carried out at a portion of the magnetizable material reserved for that purpose, using either A.C. or D.C. demagnetization. In the latter case, the output at an intermediate point of gradual slope may also be compared to the output of total reversal upon further application of the D.C. reversing field to a magnitude at which the A.C. demagnetization curve approaches randomization.

A more sophisticated test for validity involves the use of digital data, e.g., the number of a credit card or some simple arbitrary number which the customer would memorize. At the time the card is issued, the number is permanently recorded at a high level sufficient to substantially saturate the magnetizable material, regardless of its coercivity. Upon presentation of the credit card, a device reads the number and records it at another area at a low level sufficient to magnetize only part of the magnetizable material, that is, the magnetizable material of low coercivity. Also, the customer or the person accepting the card enters the number into the device which matches the number both against a playback of the number recorded by the device (to verify presence of material of low coercivity) and, after applying a low-level erasing field to both areas, against the original recording (to verify that the card contains magnetizable material not affected by the low-level erasure). In addition, the relative amplitude of the two outputs can be matched against a predetermined range of values.

In another validating device of the type just described, the code number $x$ is recorded at a high level as a simple chain of $x$ bits on a single track. The customer supplies the number $x$ which is entered into the machine and recorded on the same track at a low level at a doubled frequency, with the first bit coinciding with the first bit of the prerecorded signal. If the customer supplied the correct code, $3/2x$ bits are first counted on playback, and after low-level erase, $x$ bits are counted.

The magnetizable material on which information is recorded should be embedded within a pair of durable nonmagnetic surface layers to protect against scratches which would produce false signals. Furthermore a much used document such as a credit card may gradually accumulate fingerprints, dirt and grime which are more likely to interfere with signal reproduction in contact recording than in the noncontact recording which the nonmagnetic surface layers would entail. Because of the relatively low bit density in noncontact recording (e.g., 50–300 bits per inch), the magnetizable material preferably extends over the full area of the document, providing space for recording a generous amount of information. Various protective surfaces are suitable such as synthetic polymers which may be coated from solution directly over the magnetizable layer. Such a coating preferably contains a light-color pigment such as titanium dioxide to provide a contrasting background for printed information and may be quite thin, such as about 0.2 mil (5 microns). On the other hand, a protective covering of paper or of a preformed polymer plus adhesive may be as thick as about 3 mils (75 microns) without deleterious effect.

Although the magnetizable material used for recording data should be protected, this is not necessary for magnetizable material used only for testing validity. For example, a credit card may contain a single interior layer of magnetizable material of low coercivity for recording data, and also printed with ink containing magnetizable material of relatively high coercivity. Such printing plus an underlying portion of the magnetic recording layer provide a composite of magnetizable material whose A.C. demagnetization curve has a slope as defined below of less than 0.2 at a point between 10% and 90% of saturated output, assuming a sufficient difference in the two coercivities. In constructions involving separate layers of magnetizable material of different coercivities, a difference of 50, or preferably 100, oersteds is adequate. Whether exposed or beneath the surface, magnetic printing of high coercivity, perhaps the name of the issuer or a decorative pattern, would enable supplementary validation by visual means using a viewer of the type disclosed in Youngquist et al. Pat. No. 3,013,206.

THE DRAWING

Figure 1:
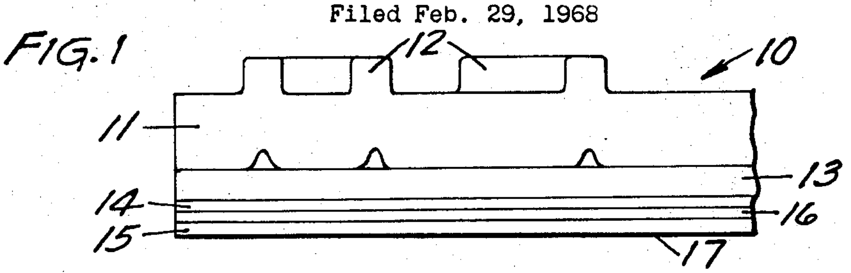
FIG. 1 is a schematic edge view of a credit card embodying this invention.

Referring to FIG. 1, a credit card 10 may be constructed of a layer 11 of 10-mil (250-micron) polyvinyl chloride and embossed with characters 12 in the usual manner. A 5-mil polyvinyl chloride layer 13 is heat-sealed to the layer 11 to provide a smooth undersurface to which is applied a heat-activatable adhesive 14. Separately coated on a 1.5-mil (40-micron) biaxially-oriented polyethylene terephthalate film 15 is a 0.6-mil (15-micron) layer 16 of magnetizable powder in a nonmagnetic binder which is adhered by the adhesive 14 to the layer 13. The polyethylene terephthalate film 15 is preferably pigmented white to provide a contrasting color for instructions and limitations which may be printed on the exposed surface 17.

The other figures of the drawing will be discussed in detail in conjunction with the working examples of the present invention.

EXAMPLE 1

A magnetic recording medium suitable for incorporation into a document in the practice of the present invention was prepared using one part by weight of each of barium ferrite particles and acicular gamma-$Fe_2O_3$ particles. The barium ferrite ("Stackpole BG–1") was of approximately single domain size (abzout ½ micron in diameter) and had a coercivity of about 2000 oersteds. The gamma-$Fe_2O_3$ had an average particle length of about one micron, a ratio of length to width of about 5:1 and a coercivity of approximately 300 oersteds. These magnetizable particles were ball milled in toluol (45% solids) with a wetting agent until dispersed, at which point was added one part by weight of a plasticized copolymer of 89 parts by weight vinyl chloride and 11 parts vinyl acetate (VYHH) dissolved in methyl ethyl ketone. The resultant dispersion was coated on 1.0-mil biaxially-oriented polyethylene terephthalate film, and the coating was subjected to a unidirection magnetic field of 3000 oersteds to orient the anisotropic magnetizable particles in the direction of intended head-to-tape travel, after which the coating was dried in an oven. The dried coating thickness was 0.5 mil.

For testing, the product was slit in the direction of particle orientation to ½-inch width. The resultant magnetic recording tape exhibited in that direction a $B_r$ of 685 gauss and a coercivity of 737 oersteds.

Figure 3:
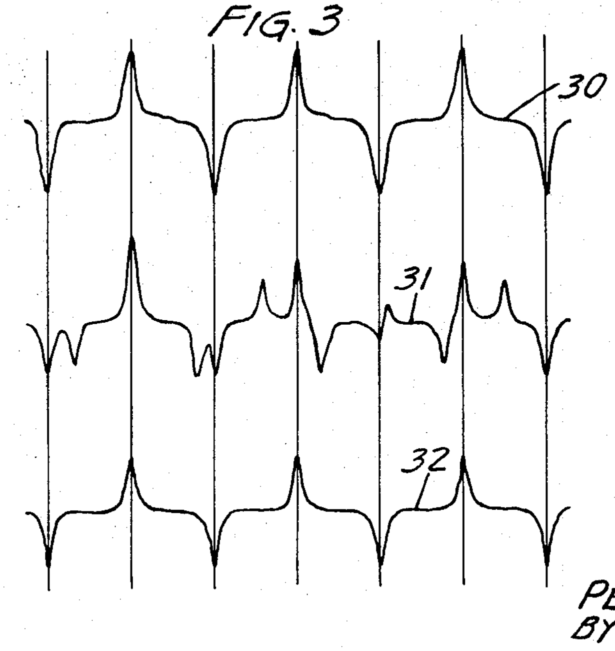
FIG. 3 shows typical oscilloscope patterns obtained on playback of signals recorded on typical preferred magnetic media of the present invention.

A first signal representing primary information was recorded on the tape at a high level approaching saturation of the barium ferrite particles, and on playback of the signal, the oscilloscope tracing 30 shown in FIG. 3 was obtained. A second signal representing auxiliary information was then recorded over the primary signal at a different frequency and at a relatively low level approaching saturation of the gamma-$Fe_2O_3$. The oscilloscope pattern 31 was obtained on playback of the composite signal. At this point, the tape was subjected to erasure at the level at which the auxiliary signal had been recorded. Upon playback, the osciloscope tracing 32 was obtained, showing that only the primary signal remained and that there had been essentially no change in the primary signal except for a slight reduction in amplitude. Repeated erasure of the tape at the level approaching saturation of the gamma-$Fe_2O_3$ produced no observable change in the primary signal. Subsequent erasure at the level at which the primary signal had been recorded removed the signals.

The oscilloscope tracings of FIG. 3 were obtained by contact recording with a recording head gap of about 0.1 mil (2.5 microns). An essentially identical set of tracings was obtained at a head-to-tape spacing of about 1 mil with a recording head gap of about 5 mils (125 microns).

Figure 2:
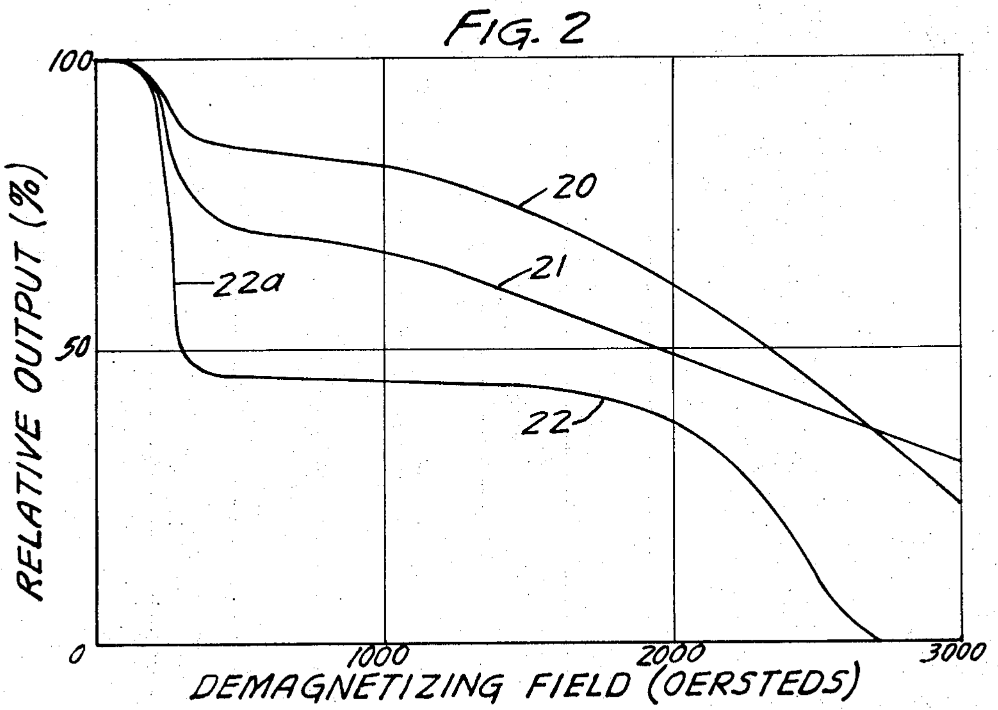
FIG. 2 shows A.C. demagnetization curves of typical preferred magnetizable media of the present invention.

The A.C. demagnetization curve of the tape of Example 1 in the direction of particle orientation is shown by curve 20 of FIG. 2. The slope of this curve at 800 oersteds is 0.0065, determined by dividing the difference in percent output by the difference in the demagnetizing field between 800±8% or 864 and 736 oersteds. The demagnetization curve is thus sufficiently flat at 800 oersteds that magnetic recording media made from time to time in accordance with this example would always exhibit approximately the same relative output at 800 oersteds, in spite of variations in coercive force normally experienced in manufacture and in spite of probable errors in mass-produced reading devices.

A credit card incorporating the magnetizable medium of Example 1 may be tested for validity using a preselected area of the medium as follows:

(a) magnetize the magnetizable material to saturation,
(b) sense the output,
(c) apply an 800-oersted A.C. erasing field,
(d) sense the output,
(e) measure the ratio of the outputs at (b) and (d),
(f) if that ratio falls within $$\frac{83\pm 6}{100}$$

the credit card passes the validity test.

An allowable error of ±6% of output saturation in this test provides reasonable tolerances in manufacture of the credit card and of the devices for checking validity, while still making the card difficult to counterfeit.

EXAMPLE 2

A magnetic recording medium was prepared as in Example 1 except that 1.5 parts of the acicular gamma-$Fe_2O_3$ and 0.5 part of the barium ferrite were used. The A.C. demagnetization curve is shown by curve 21 of FIG. 2.

At a demagnetization field of 800 oersteds, the slope of curve 21 is 0.0065, the same as that of curve 20. However, the two recording media are readily distinguishable by the great difference in relative output at that level. Thus, one credit card company could employ the magnetic recording medium of Example 1 and another, that of Example 2, and the two would be readily distinguished simply by comparing the saturated output to the output at a demagnetizing field of 800 oersteds.

EXAMPLE 3

Two separate dispersions were prepared in the same way as in Example 1, except each dispersion contained only one of the two pigments, either the barium ferrite or the gamma-$Fe_2O_3$. The barium ferrite dispersion was coated on 1.0-mil biaxially-oriented polyethylene terephthalate film, and the particles were oriented in a unidirectional magnetic field of 3000 oersteds, followed by drying in an oven to a thickness of 0.48 mil. Over this dried coating was coated a dispersion of gamma-$Fe_2O_3$ which was subjected to a unidirectional magnetic field of 1000 oersteds in the same direction as the first, followed by drying in an oven to provide a composite coating thickness of 0.94 mil. For testing, the coated product was slit in the direction of particle orientation to ½-inch width to provide a tape which exhibited in that direction a $B_r$ of 910 gauss and a coercivity of 333 oersteds.

When a primary signal was recorded on this composite tape coating at a high level approaching saturation of the barium ferrite, the signal on playback approximated the tracing 30 shown in FIG. 3. When an auxiliary signal was recorded over the primary signal at a relatively low level approaching saturation of the gamma-$Fe_2O_3$, the composite signal on playback was very similar to the tracing 31. When the tape was subjected to erase at the relatively low level of recording of the auxiliary signal, the playback approximated the pattern of the oscilloscope tracing 32. Repeated erasure at that low level did not change the signal pattern.

Indicated in FIG. 2 by reference character 22 is the A.C. demagnetization curve for the composite tape coatings. The slope of this curve at 800 oersteds is 0.0 and is sufficiently different from the slopes of curves 20 and 21 at 800 oersteds that this would provide a second distinguishing feature for validation. The slope at the portion of curve 22 indicated by reference character **22*a*** is 0.5.

To make counterfeiting even more difficult, a recording medium may be made of three layers, each having a different coercivity to provide two distinctly different areas of gradual slope between 10% and 90% of saturated output.

If desired, a recording medium may have one layer of acicular gamma-$Fe_2O_3$ particles oriented in the direction of head-to-tape travel and a second layer oriented perpendicular thereto or simply unoriented. The greatly different effective coercivities of two cross-oriented layers of acicular gamma-$Fe_2O_3$ yields a demagnetization curve on the order of that of curve 22. To increase or decrease the relative output at a given point on the curve, one merely adjusts the relative thicknesses or relative densities of magnetizable particles in the two layers.

While the recording media of the foregoing examples lend themselves to a validity check at 800 oersteds, the slopes of other media may be too steep at 800 oersteds, and each would be checked at a suitable demagnetizing field where its slope is gradual.

In order to reduce fraud to a minimum, it is anticipated that the present invention will be made available to various companies or groups in such a way that documents and magnetic recording devices are specially designed for each. Where a number of companies share a set of magnetic recording devices, each may have a unique formulation distinguishable from the others. If a criminal element duplicated one formulation, that company would call in and reissue cards of a new formulation.

Although the magnetic recording layers of the examples are of conventional particle-in-binder construction, it will be appreciated that other types of magnetic recording media are suitable such as plated layers of electrolytic or electroless deposition. A promising low-cost process involves dispersion of magnetizable particles of high and low coercivity in paper pulp to provide a paper which is itself a magnetizable layer. To this are applied nonmagnetic surface layers by conventional printing or lithographing procedures.

Although the foregoing description focuses on the validation of documents such as credit cards, this invention also has value in article handling. For example, a magnetic recording document incorporating magnetizable material of high and low coercivity may be used as a merchandise tag. In a specific instance, the manufacturer of an article of clothing records permanent identification plus auxiliary information such as a suggested retail price and the store to which it is to be shipped. The tag enables automation of such functions as sorting and inventory control. After sale, possibly at a reduced price involving revision of that auxiliary information, the tag is used as a magnetic recording media for automatic control of accounting, billing and inventory functions. As with credit cards, the recorded information is reproduced and processed electronically, thus virtually eliminating delays and errors invariably associated with human handling. In both credit cards and merchandise tags, it is preferred that the reading devices be incapable of altering the permanent or primary information which can be recorded only at the point at which the document is issued.

Where primary and auxiliary signals are superimposed as in the tests which resulted in the oscilloscope tracings of FIG. 3, a number of techniques are known in the art for decoding. One technique which is well known in the art is to record the primary and secondary signals using carrier frequencies which are 90° out of phase. Another well-known technique is to record the primary and secondary signals at differing carrier frequencies, with filtering to separate the signals on playback. In a third technique which permits the signals to be recorded in phase and of the same frequency, composite signals such as those of tracing 31 can be reproduced and the tape then subjected to low level erase followed by separate playback of the remaining primary signal, which is subtracted from the composite signals to reproduce the secondary signal. Such techniques make counterfeiting even more difficult.

What is claimed is:

1. A magnetic recording document having a plurality of layers including

- a pair of durable nonmagnetic surface layers, at least one of which bears visible indicia characteristic to the document,
- at least one interior magnetizable layer suitable for recording and reproducing data associated with the use of the document, and
- a composite of magnetizable material including said interior magnetizable layer, which composite has an A.C. demagnetization curve having a slope as herein defined of less than 0.2 at a point between 10% and 90% of saturated output, such composite being useful for validating the document.

2. A document as defined in claim 1 wherein said composite of magnetizable material consists of said at least one interior magnetizable layer.

3. A document as defined in claim 2 wherein said composite of magnetizable material consists of a first portion of particles of relatively low coercivity and a second portion of particles of a coercivity at least 50 oersteds higher than that of the first portion, and where the two portions of particles are mixed together to provide a single interior magnetizable layer, the coercivity of the second portion is at least 200 oersteds higher than that of the first portion.

4. A document as defined in claim 2 wherein said composite of magnetizable material consists of two superposed layers of magnetizable particles in nonmagnetizable binder.

5. A document as defined in claim 1 wherein said at least one interior magnetizable layer consists of a homogeneous mixture of magnetizable particles in a nonmagnetizable binder in a single layer, which mixture of particles provides the composite of magnetizable material whose A.C. demagnetization curve has a slope as herein defined of less than 0.2 at a point between 10% and 90% of saturated output.

6. A document as defined in claim 5 wherein the magnetizable particles of said homogeneous mixture consist of a first portion of relatively low coercivity and a second portion having a coercivity at least 200 oersteds higher than that of the first portion.

7. A document as defined in claim 1 having a single interior magnetizable layer suitable for recording and reproducing data and having magnetizable material of relatively high coercivity incorporated into said visible indicia, which magnetizable material of relatively high coercivity plus the single interior magnetizable layer form the composite of magnetizable material whose A.C. demagnetization curve has a slope as herein defined of less than 0.2 at a point between 10% and 90% of saturated output.

8. A document as defined in claim 7 wherein the coercivity of the magnetizable material incorporated in the visual indica is at least 100 oersteds higher than that of the interior magnetizable layer.

9. A document as defined in claim 1 wherein said at least one interior magnetizable layer consists of a first layer of magnetizable particles in nonmagnetizable binder extending over one area of the document and a second layer of magnetizable particles in nonmagnetizable binder extending over a different area of the document, a preselected area of said first and second layers providing the composite of magnetizable material whose A.C. demagnetization curve has a slope as herein defined of less than 0.2 at a point between 10% and 90% of saturated output.

10. Method of validating a document comprising the following sequential steps:

(1) incorporating into the document a composite of magnetizable material whose A.C. demagnetization curve has a slope as herein defined of less than 0.2 at a given point between 10% and 90% of saturated output,
(2) magnetizing said magnetizable material,
(3) sensing the output from said magnetizable material at the level of demagnetization corresponding to said given point on the A.C. demagnetization curve and sensing the output at least at one other point on said demagnetization curve at which the slope is also less than 0.2, and
(4) matching the outputs of step (3) against predetermined values as a test for validity of the document.

11. Method as defined in claim 10 wherein in step (3) the output is first sensed after application of a D.C. reversing field to a magnitude at which the A.C. demagnetization curve has a slope of less than 0.2 at a point between 10% and 90% of saturated output, and the output is again sensed after further application of the D.C. reversing field to a magnitude approaching randomization on the A.C. demagnetization curve.

12. Method as defined in claim 10, the steps of which are modified as follows:

- in step (3) sensing the output from said magnetizable material at said given point and at a point where the composite of magnetizable material is substantially saturated, and
- in step (4) matching the relative value of those two outputs against a predtermined range of relative values.

13. Method as defined in claim 10, the steps of which are modified as follows:

- in step (1) incorporating into the document magnetizable material consisting of a first portion of particles of low coercivity and a second portion of particles of relatively high coercivity,
- in step (2) magnetizing at a level sufficient to substantially magnetize the particles of both coercivities,
- in step (3) sensing the output from the substantially magnetized particles of both coercivities and, after selectively erasing the low coercivity particles, sensing the output from the high coercivity particles, and
- in step (4) matching the relative value of the two outputs of step (3) against a predetermined range of relative values.

14. Method as defined in claim 13, the steps of which are modified as follows:

- in step (2) magnetizing by recording a first set of digital data at a level sufficient to record on the particles of both coercivities, and also magnetizing by recording a second set of digital data at a low level to record only on the particles of low coercivity,
- in step (3) reproducing the total digital data and then, after selectively erasing at said low level, reproducing the first set of digital data, and
- in step (4) matching the reproduced first set and total set of digital data to reference values.

15. Method of validating a document comprising the following sequential steps:

(1) incorporating into the document a recording medium comprising magnetizable material, a significant first portion of which has low coercivity and a significant second portion of which has relatively high coercivity, a composite of which two portions have an A.C. demagnetization curve whose slope as herein defined is less than 0.2 at a point between 10% and 90% of saturated output, (2) magnetizing the recording medium at a level sufficient to magnetize the material of both coercivities, (3) sensing the remanent flux of the magnetized medium, (4) subjecting the magnetized medium to an erasing field sufficient to substantially erase the low coercivity material without substantial erasure of the high coercivity material, (5) again sensing the remanent flux of the medium, (6) comparing the remanent flux as measured in step (5) to the remanent flux as measured in step (3), and (7) matching the relative value obtained in step (6) against a predetermined range of relative values as a test for validity of the document.

16. Automated method of employing data-transmitting documents to be processed at remote stations of a data or article handling network, said method including the steps of:

(1) issuing a document having a pair of durable nonmagnetic surface layers bearing visible indicia characteristic to the document and a composite of magnetizable material whose A.C. demagnetization curve has a slope as herein defined of less than 0.2 at a point between 10% and 90% of saturated output, (2) magnetically recording primary information at a high level sufficient to magnetize substantially all of said magnetizable material, (3) magnetically recording auxiliary information at a low level sufficient to magnetize only part of said magnetizable material, whereby said auxiliary information can be erased and revised without erasing the primary information, (4) reproducing said information at said remote stations to put the information to use, (5) selectively revising the auxiliary information to reflect the use to which the reproduced information is put, and (6) transmitting at least part of the reproduced information to a data processing station of said network.

References Cited

UNITED STATES PATENTS

| | | | |
|---|---|---|---|
| 2,922,106 | 1/1960 | Oates et al. | 177—100.2X |
| 3,463,907 | 8/1969 | Lewis | 324—34X |
| 3,474,331 | 10/1969 | Chur | 179—100.2X |

DONALD J. YUSKO, Primary Examiner

U.S. Cl. X.R.

179—100.2; 340—174.1